UNITED STATES PATENT OFFICE.

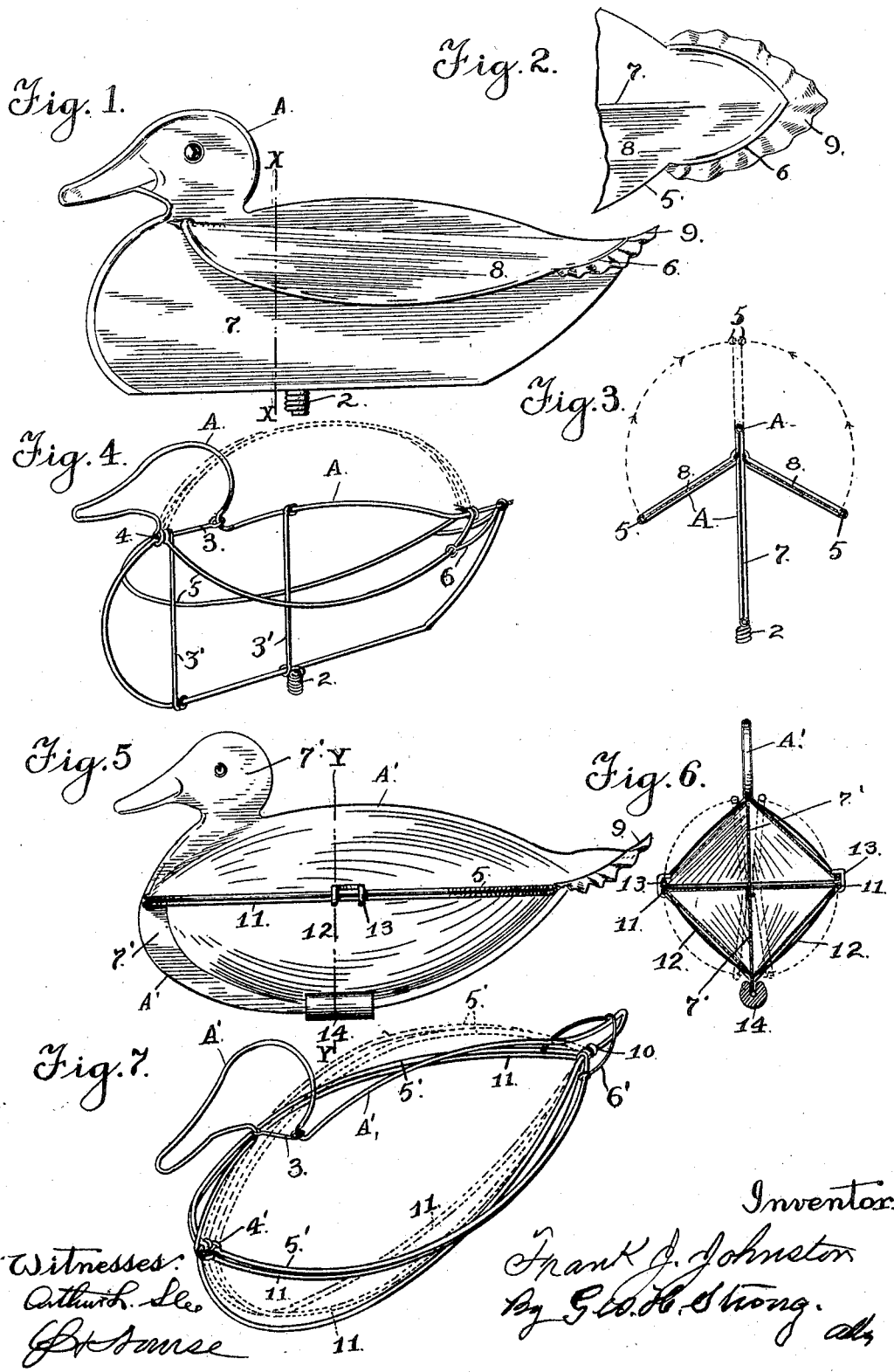

FRANK JOHN JOHNSTON, OF SACRAMENTO, CALIFORNIA.

DECOY.

No. 812,499.      Specification of Letters Patent.      Patented Feb. 13, 1906.

Application filed September 8, 1905. Serial No. 277,482.

*To all whom it may concern:*

Be it known that I, FRANK JOHN JOHNSTON, a citizen of the United States, residing at Sacramento, in the county of Sacramento and State of California, have invented new and useful Improvements in Decoys, of which the following is a specification.

My invention relates to decoys or lures in the image of a duck or other bird or fowl.

The object is to provide a simple practical durable decoy which shall be foldable into a small space for packing and transportation and which will require neither filling nor inflation when set out for use.

The invention consists of the parts and the construction and the combination of parts, as hereinafter more fully described and claimed, having reference to the accompanying drawings, in which—

Figure 1 is a side elevation of my profile-decoy. Fig. 2 is a plan of the rear tail portion of the same. Fig. 3 is a section on line X X, Fig. 1. Fig. 4 is a perspective of the frame for a profile-decoy. Fig. 5 is a side elevation of my floating decoy. Fig. 6 is a section on line Y Y, Fig. 5. Fig. 7 is a perspective of the frame of my floating decoy.

Fig. 1 represents what is known as a "profile-decoy," but differs from the ordinary simple profile by the addition of a foldable back and tail, so that the decoy presents the image of a bird not only from the side, but from overhead, and is just that much more effective as a lure.

In the construction of my decoy I employ a frame A, of wire, bamboo, or any other suitable stiff, bendable, and durable material bent into just the side outline or profile of the bird to be simulated. This profile is complete and includes the head and body and corresponds to a vertical longitudinal central section through the bird or fowl simulated. The ends of the wire are shown as brought together under the belly portion into a socket 2 to receive a stick or rod by which the decoy may be later set up in the mud or other suitable spot. The neck part of the profile-frame A may be connected by a wire 3 to give rigidity to the frame. For the same purpose vertical brace-wires 3' may be used connecting the horizontal parts of the frame A. At the breast part of the profile-frame a loop 4 or other suitable inwardly-extending projection is formed in the frame, to which the forward ends of the wires 5, constituting the two back-frames, are pivotally connected, the other ends of these back-frame wires pivoting to or on the profile-frame adjacent to the tail end of the latter. These back-frames are arranged one on each side of the profile-frame and are suitably bowed to simulate the outline of a bird as viewed from above and when resting on the water.

Pivotally connected to the extreme rear end of the frame A and to the back-frames 5, proximate to their rear pivots, are the tail-frames 6.

A suitable waterproof material or fabric 7 is stretched flat over both sides of the profile-frame and secured thereto in any appropriate fashion, and this fabric may be painted or colored in any desired manner to simulate plumage.

A back-frame and a tail-frame on each side of the profile-frame are covered with a suitable flexible waterproof fabric 8, this fabric being connected to said back-frames and tail-frames and to the top of the profile-frame A in such fashion that the side frames and tail-frames may fold downward to assume an incline corresponding to the slope of a duck's back and to be folded upward flat against one another in a plane or planes approximately continuous or parallel with the plane of the profile. It is not designed that the back-frames fold downward more than to assume the slope mentioned. The cut of the covering 8 and the curve of its opposed supports, together with proper stretching when in the manufacture of the decoy, insure the maintenance of the back and tail portions in proper life-like position. The back and tail portions may, like the profile, be painted or colored to simulate plumage.

If desired, a flexible fringe 9, of fabric, may be left extending around and beyond the edges of the tail-frames in imitation of tail-feathers and to relieve the hard inflexible outline of the decoy.

This construction produces a collapsible decoy which is very durable, light, cheap, and compact for packing and transportation. When not in use, the back and tail portions are folded upward to form a perfectly flat structure.

In Figs. 5, 6, and 7 I have shown a modification of my invention employing the same profile-frame structure and foldable back and tail portions, but adapted as a floating decoy. A' represents a profile-frame, 5' the foldable back-frames, and 6' the tail-frames, all constructed and covered as described in connection with Fig. 1, except that the socket 2 is omitted and a loop 10 is provided on the rear of the frame A' for the pivotal attachment of one end of the side body-frame wires 11. The latter are suitably bowed and their opposite ends pivoted to the front loop 4' or equivalent points of supports. The flat covering 7' on the frame A' forms a vertical support for the attachment of the two edges of a flexible waterproof covering 12, which is stretched over and fastened to each side body-frame 11, each covering 12 inclosing a substantially air and water tight cell approximately triangular in cross-section when its particular side body-frame 11 is turned outward and upward into a plane approximately at right angles to the plane of frame A'. This covering, which may be oiled silk or any other suitable fabric or material, is so connected at the edges and to a frame 11 that the latter is limited in its upward movement. These side body-frames are adapted to fold downward just as the back-frames are adapted to fold upward. For convenience and compactness the frames 11 are connected to the frame A' and are so shaped and proportioned that when the frames 11 are folded flat and into parallel planes against frame A' they will approximately correspond in outline to the outline of the under half of frame A'. When the frames 11 are spread out horizontally into nearly the same plane and the back-frames are similarly spread out, the back-frame and side-frame on each side are brought close together and may be locked together by suitable means as the wire hook member 13, pivoted on one frame, as 11, and engaging over the other frame 5'. The raising of the body-frames 11 has the effect of distending the coverings 12, and when the back-frames are dropped and locked to the body-frames and the exposed parts of the coverings suitably painted or colored in imitation of plumage a structure is produced which remarkably resembles a bird from either top or side view.

The underneath portion of the decoy may be suitably counterweighted, as at 14, to maintain the decoy upright in the water.

By this construction I produce a practical floating collapsible non-inflatable decoy. It is quickly set up, as it requires no blowing up; nor does it require drying when taken in. It folds into a perfectly flat package scarcely half an inch thick, besides being very light, strong, and durable.

It is possible that various modifications in my invention may be made without departing from the principle thereof, and I do not wish to be understood as limiting myself to the specific construction as herein shown and described.

Having thus described my invention, what I claim, and desire to secure by Letters Patent, is—

1. In a decoy, a profile-frame, back-frames hinged to said profile-frame and foldable upward into planes parallel with the profile-frame, and suitable flexible coverings for said frames.

2. In a decoy the combination of a profile-frame, back-frames hinged to said profile-frame and foldable upward into planes substantially parallel with the plane of the profile-frame, similarly-foldable tail-frames hinged to the back profile-frame and attached to the back-frames, and suitable coverings for said frames.

3. In a decoy the combination of a profile-frame, back-frames hinged to said profile-frame and foldable upward into planes substantially parallel with the plane of the profile-frame, similarly-foldable tail-frames hinged to the back profile-frame and attached to the back-frames, suitable coverings for said frames, the covering for the tail-frames extending beyond said frames to provide a flexible fringe in simulation of tail-feathers.

4. In a decoy the combination of a profile-frame, back-frames hinged to the front and rear of said profile-frame and foldable into planes substantially parallel with the plane of the profile-frame, a flat covering for the profile-frame, and flexible coverings attached to the back-frames and to or adjacent to the back portion of the profile-frame, said back-coverings limiting the downward movement of said back-frame.

5. In a decoy the combination of a rigid one-piece profile-frame, a covering therefor, back-frames hinged to said profile-frame, flexible coverings connected with said back-frames and said profile-frame and limiting the downward movement of said back-frames, said latter being foldable upwardly into planes approximately parallel with the plane of the profile-frame.

6. In a decoy the combination of a rigid one-piece profile-frame, a covering therefor, back-frames hinged to said profile-frame, flexible coverings connected with said back-frames and said profile-frame and limiting the downward movement of said back-frames, said latter being foldable upwardly into planes approximately parallel with the plane of the profile-frame, side body-frames hinged to the profile-frame, and a flexible waterproof covering secured to the side body-frames and to the covering of the profile-frame inclosing compartments.

7. In a decoy the combination of a rigid one-piece profile-frame, a covering therefor, back-frames hinged to said profile-frame, flexible coverings connected with said back-frames and said profile-frame and limiting the downward movement of said back-frames, said latter being foldable upwardly into planes approximately parallel with the plane of the profile-frame, side body-frames hinged to the profile-frame, a flexible waterproof covering secured to the side body-frame and to the covering of the profile-frame inclosing compartments, said side body-frames being foldable downward against the profile-frame.

8. In a decoy the combination of a profile-frame, foldable back-frames and foldable side body-frames, and a suitable covering for said frames.

9. In a decoy the combination of a profile-frame, foldable back-frames and foldable side body-frames, and a suitable covering for said frames, said back-frames being foldable independently of the side body-frames.

10. In a decoy the combination of a profile-frame, foldable back-frames and foldable side body-frames, and a suitable covering for said frames, said back-frames being foldable upwardly and said side body-frames being foldable downwardly against the profile-frame to form a flat package.

11. In a decoy the combination of a profile portion, foldable back and side body portions, said side body portions inclosing chambers, and means for locking the side body portion and back portion in operative position.

12. In a decoy the combination of a profile portion, foldable back and side body portions, said side body portions inclosing chambers, and means for locking the side body portion and back portion in operative position, said locking means comprising a hook member carried by one portion and engaging a corresponding opposed portion.

13. In a decoy the combination of a rigid profile-frame, a covering therefor, back and side body-frames hinged to said profile-frame, flexible coverings for said side body and back frames, said side body-covering inclosing compartments.

14. In a decoy the combination of a rigid profile-frame, a covering therefor, back and side body-frames hinged to said profile-frame, flexible coverings for said side body and back frames, said side body-covering inclosing compartments, said side body-frames being foldable downwardly, and said back-frames being foldable upwardly against the profile-frame.

15. In a decoy the combination of a rigid profile-frame, a covering therefor, back and side body-frames hinged to said profile-frame, flexible coverings for said side body and back frames, said side body-covering inclosing compartments, said side body-frames being foldable downwardly, and said back-frames being foldable upwardly against the profile-frame, and means when said frames are distended to lock the back-frames to the side body-frames.

In testimony whereof I have hereunto set my hand in presence of two subscribing witnesses.

FRANK JOHN JOHNSTON.

Witnesses:
  MABEL C. DAVIS,
  L. S. UPSON.